(12) United States Patent
Dong

(10) Patent No.: US 11,868,181 B2
(45) Date of Patent: Jan. 9, 2024

(54) FLEXIBLE DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Wenbo Dong, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 342 days.

(21) Appl. No.: 17/280,908

(22) PCT Filed: Nov. 30, 2020

(86) PCT No.: PCT/CN2020/132732
§ 371 (c)(1),
(2) Date: Mar. 28, 2021

(87) PCT Pub. No.: WO2022/036920
PCT Pub. Date: Feb. 24, 2022

(65) Prior Publication Data
US 2023/0122526 A1    Apr. 20, 2023

(30) Foreign Application Priority Data
Aug. 17, 2020 (CN) .......................... 202010824450.8

(51) Int. Cl.
*G06F 1/16* (2006.01)

(52) U.S. Cl.
CPC .................................. *G06F 1/1652* (2013.01)

(58) Field of Classification Search
CPC ..................................................... G06F 1/1652
See application file for complete search history.

(56) References Cited

U.S. PATENT DOCUMENTS 9,733,672 B2 *  8/2017  Kim ...................... G06F 1/1652
9,877,384 B2 *  1/2018  Lee ........................ H05K 1/028
(Continued)

FOREIGN PATENT DOCUMENTS

CN      101276030 A     10/2008
CN      106251779 A     12/2016
(Continued)

OTHER PUBLICATIONS

International Search Report in International application No. PCT/CN2020/132732, dated Apr. 27, 2021.
(Continued)

*Primary Examiner* — Lisa Lea-Edmonds
(74) *Attorney, Agent, or Firm* — PV IP PC; Wei Te Chung; Zhigang Ma

(57) ABSTRACT

A flexible display device includes a rolling assembly and a flexible display module. The rolling assembly includes a shaft and at least a shell layer coupled to each other and collectively allowing for formation of a cross-sectional curve based on a characteristic of an Archimedes spiral. The rolling assembly rotates in a direction of releasing or retracting the flexible display module along with processes of expanding and retracting the flexible display module, in order to release or return to a linked state of the shell layer and the shaft and to prevent mechanical scratches caused by overlap of the flexible display module from occurring.

20 Claims, 5 Drawing Sheets

(56) References Cited

U.S. PATENT DOCUMENTS

| | | | |
|---|---|---|---|
| 10,146,260 B2* | 12/2018 | Lee | G06F 1/1652 |
| 10,798,831 B2* | 10/2020 | Shin | H05K 3/284 |
| 10,888,005 B2* | 1/2021 | Lee | H04M 1/0268 |
| 11,116,091 B1* | 9/2021 | Zhang | G09F 9/301 |
| 11,330,724 B2* | 5/2022 | Lee | H05K 5/0017 |
| 11,387,426 B2* | 7/2022 | Xu | H10K 77/111 |
| 11,406,030 B2* | 8/2022 | He | G02F 1/13 |
| 11,423,811 B2* | 8/2022 | Choi | G06F 1/1652 |
| 11,540,407 B2* | 12/2022 | Zhang | H05K 5/0226 |
| 11,547,002 B2* | 1/2023 | Kim | H10K 59/12 |
| 11,553,278 B2* | 1/2023 | Kim | G06F 1/1688 |
| 11,632,866 B2* | 4/2023 | Pyo | H10K 50/84 361/807 |
| 2018/0014415 A1* | 1/2018 | Choi | G06F 1/1652 |
| 2018/0210559 A1* | 7/2018 | Xia | H04M 1/72409 |
| 2021/0385957 A1* | 12/2021 | Zhang | H05K 5/0217 |
| 2022/0327970 A1* | 10/2022 | Park | G06F 1/1601 |
| 2023/0004189 A1* | 1/2023 | Luo | G06F 1/1656 |
| 2023/0122526 A1* | 4/2023 | Dong | G06F 1/1652 361/679.27 |

FOREIGN PATENT DOCUMENTS

| | | |
|---|---|---|
| CN | 206039368 U | 3/2017 |
| CN | 107492309 A | 12/2017 |
| CN | 109887419 A | 6/2019 |
| CN | 111047995 A | 4/2020 |
| CN | 111383539 A | 7/2020 |
| CN | 111837090 A | 10/2020 |
| CN | 112002226 A | 11/2020 |

OTHER PUBLICATIONS

Written Opinion of the International Search Authority in International application No. PCT/CN2020/132732, dated Apr. 27, 2021.
Chinese Office Action issued in corresponding Chinese Patent Application No. 202010824450.8 dated May 6, 2021, pp. 1-10.

* cited by examiner

FLEXIBLE DISPLAY DEVICE

RELATED APPLICATIONS

This application is a Notional Phase of PCT Patent Application No. PCT/CN2020/132732 having international filing date of Nov. 30, 2020, which claims the benefit of priority of Chinese Patent Application Nos. 202010824450.8 filed on Aug. 17, 2020. The contents of the above applications are all incorporated by reference as if fully set forth herein in their entirety.

BACKGROUND OF INVENTION

1. Field of Invention

The present invention relates to a technical field of displays, and particularly to, a flexible display panel.

2. Related Art

Flexible display devices have advantages of good bending resistance, and can be folded and rolled to make their volume smaller and occupy less space, so they are more and more popular in markets.

Conventional rollable manners in retracting flexible display devices are performed by rotating reels to drive overall module structures to be attached to surfaces of the reels. Rollable manners can be classified into two types: "an inward winding type" and "an outward winding type". The inward winding type is that display surfaces of flexible displays face inward, such that the display surfaces face reels during a winding process and first contact the reels. The outward winding type is contrary to the inward winding type and is performed through back module structures to be in direct contact with reel mechanisms. Regardless of any type of winding, an occurrence of mechanical scratches caused by overlap of flexible displays is inevitable when number of winding turns of reels increases and a winding radius gradually decreases. Under long-term stretching and rewinding activities, it tends to cause a lot of scratches on surfaces of the flexible displays, which results in poor experiences of using display devices as well as reducing lifespans of the display devices.

Accordingly, it is necessary to provide an improved flexible display device to solve the above-mentioned technical problems.

SUMMARY OF INVENTION

An object of the present invention is to provide a flexible display device to solve technical problems with traditional flexible display devices that when flexible displays are retracted for storage, with an increase in number of winding turns and a gradual decrease in a winding radius, the flexible displays are prone to overlap and thus cause mechanical scratches.

To achieve the above-mentioned object, the present invention provides technical solutions as follows:

An embodiment of the present invention provides a flexible display device, comprising a rolling assembly and a flexible display module at least partially wound in the rolling assembly; wherein the rolling assembly comprises a shaft and at least a shell layer coaxially arranged from an inside to an outside of the rolling assembly, the shaft and the at least a shell layer are coupled to each other and collectively allow for formation of a cross-sectional curve based on a characteristic of an Archimedes spiral, and the flexible display module comprises a first end fixedly connected to the shaft by an adhesive; wherein the flexible display module is configured to drive the rolling assembly to rotate in a direction of releasing the flexible display module from a retracted state along with a process of expanding the flexible display module, enabling a linked state of the shell layer and the shaft to be released; and wherein the rolling assembly is configured to rotate in a direction of retracting the flexible display module along with a process of retracting the flexible display module, enabling the shell layer and the shaft to return to the linked state.

According to an embodiment of the flexible display device provided by the present invention, the shell layer comprises an inner shell layer coupled to an outer surface of the shaft, and an outer shell layer coupled to an outer surface of the inner shell layer; wherein the flexible display module is separated from the outer shell layer and the inner shell layer successively, and the outer shell layer and the inner shell layer successively release the linked state with the shaft along with the process of expanding the flexible display module; and wherein the flexible display module is successively attached to the outer shell layer and the inner shell layer, and the inner shell layer and the outer shell layer successively return to the linked state with the shaft along with the process of retracting the flexible display module.

According to an embodiment of the flexible display device provided by the present invention, a first gap is provided at a juncture of the inner shell layer and the shaft, and a second gap is provided at a juncture of the inner shell layer and the outer shell layer, wherein the first gap and the second gap collectively allow the shaft, the inner shell layer, and the outer shell layer for formation of the cross-sectional curve being a quasi-continuous Archimedes spiral.

According to an embodiment of the flexible display device provided by the present invention, the inner shell layer is provided with transition portions disposed at where the inner shell layer adjoins the first gap and the second gap, and the outer shell layer is provided with a transition portion disposed at where the outer shell layer adjoins the second gap.

According to an embodiment of the flexible display device provided by the present invention, the flexible display module comprises an anti-slip layer disposed on outer surfaces of the shaft and the shell layer, and a flexible display screen disposed on the anti-slip layer.

According to an embodiment of the flexible display device provided by the present invention, the anti-slip layer has a length greater than a length of the flexible display screen, one end of the anti-slip layer is fixedly connected to the shaft, and another end extends out of the flexible display screen.

According to an embodiment of the flexible display device provided by the present invention, the flexible display device further comprises a housing comprising an accommodating chamber in which the rolling assembly is rollably disposed; wherein the housing is provided with an opening communicating with the accommodating chamber, the flexible display module further comprises a second end extending from the opening into the accommodating chamber to be fixedly connected to the shaft, and the first end of the flexible display module is located outside the housing.

According to an embodiment of the flexible display device provided by the present invention, an inner side wall of the housing is provided with a slide rail corresponding to the shaft and the shell layer, the shaft and the shell layer are slidable along the slide rail, and the slide rail is configured with a trajectory curve coinciding with the cross-sectional curve of the shaft and the shell layer.

According to an embodiment of the flexible display device provided by the present invention, a plurality of sliders are disposed on side portions of the shaft and the shell layer, respectively, and the sliders protrude toward corresponding sides of the housing, wherein the sliders are slidable along the slide rail.

An embodiment of the present invention further provides a flexible display device, comprising a rolling assembly and a flexible display module at least partially wound in the rolling assembly; wherein the rolling assembly comprises a shaft and at least a shell layer coaxially arranged from an inside to an outside of the rolling assembly, the shaft and the at least a shell layer are coupled to each other and collectively allow for formation of a cross-sectional curve based on a characteristic of an Archimedes spiral, and the flexible display module comprises a first end fixedly connected to the shaft; wherein the flexible display module is configured to drive the rolling assembly to rotate in a direction of releasing the flexible display module from a retracted state along with a process of expanding the flexible display module, enabling a linked state of the shell layer and the shaft to be released; and wherein the rolling assembly is configured to rotate in a direction of retracting the flexible display module along with a process of retracting the flexible display module, enabling the shell layer and the shaft to return to the linked state.

According to an embodiment of the flexible display device provided by the present invention, the shell layer comprises an inner shell layer coupled to an outer surface of the shaft and an outer shell layer coupled to an outer surface of the inner shell layer; wherein the flexible display module is separated from the outer shell layer and the inner shell layer successively, and the outer shell layer and the inner shell layer successively release the linked state with the shaft along with the process of expanding the flexible display module; and wherein the flexible display module is successively attached to the outer shell layer and the inner shell layer, and the inner shell layer and the outer shell layer successively return to the linked state with the shaft along with the process of retracting the flexible display module.

According to an embodiment of the flexible display device provided by the present invention, a first gap is provided at a juncture of the inner shell layer and the shaft, and a second gap is provided at a juncture of the inner shell layer and the outer shell layer, wherein the first gap and the second gap collectively allow the shaft, the inner shell layer, and the outer shell layer for formation of the cross-sectional curve having a quasi-continuous Archimedes spiral.

According to an embodiment of the flexible display device provided by the present invention, the inner shell layer is provided with transition portions disposed at where the inner shell layer adjoins the first gap and the second gap, and the outer shell layer is provided with a transition portion disposed at where the outer shell layer adjoins the second gap.

According to an embodiment of the flexible display device provided by the present invention, each of the transition portions of the inner shell layer and the outer shell layer is arc-like in shape.

According to an embodiment of the flexible display device provided by the present invention, the flexible display module comprises an anti-slip layer disposed on outer surfaces of the shaft and the shell layer, and a flexible display screen disposed on the anti-slip layer.

According to an embodiment of the flexible display device provided by the present invention, the anti-slip layer has a length greater than a length of the flexible display screen, one end of the anti-slip layer is fixedly connected to the shaft, and another end extends out of the flexible display screen.

According to an embodiment of the flexible display device provided by the present invention, the anti-slip layer is made of ethylene vinyl acetate copolymer (EVA) plastic material with a vinyl acetate copolymer (VA) content greater than 30%.

According to an embodiment of the flexible display device provided by the present invention, the flexible display device further comprises a housing comprising an accommodating chamber in which the rolling assembly is rollably disposed, wherein the housing is provided with an opening communicating with the accommodating chamber, the flexible display module further comprises a second end extending from the opening into the accommodating chamber to be fixedly connected to the shaft, and the first end of the flexible display module is located outside the housing.

According to an embodiment of the flexible display device provided by the present invention, an inner side wall of the housing is provided with a slide rail corresponding to the shaft and the shell layer, the shaft and the shell layer are slidable along the slide rail, and the slide rail is configured with a trajectory curve coinciding with the cross-sectional curve of the shaft and the shell layer.

According to an embodiment of the flexible display device provided by the present invention, a plurality of sliders are disposed on side portions of the shaft and the shell layer, respectively, and the sliders protrude toward corresponding sides of the housing, wherein the sliders are slidable along the slide rail.

The present invention has advantageous effects as follows: a flexible display device provided by an embodiment of the present invention using a rolling assembly disposed in the flexible display device for retracing a flexible display module and including a structure of a shaft and a shell layer coaxially disposed and coupled to each other based on a characteristic of an Archimedes spiral, with a linkage operation of the shaft and the shell layer, can prevent mechanical scratches caused by overlap of the flexible display module from occurring in a retracting process in which number of winding turns continuously increases and a winding radius gradually decreases, and can reduce a probability of stress concentration in the retracting process, so that the flexible display module can freely and smoothly expand and retract.

BRIEF DESCRIPTION OF DRAWINGS

To better illustrate embodiments or technical solutions in the prior art, a brief description of the drawings used in the embodiments or the prior art description will be given below. Obviously, the accompanying drawings in the following description merely show some embodiments of the present invention, and a person skilled in the art may still derive other drawings from these accompanying drawings without creative efforts.

DESCRIPTION OF PREFERRED EMBODIMENTS

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

The present invention aims to solve problems with traditional flexible display devices that when flexible displays are retracted for storage, with an increase in number of winding turns and a gradual decrease in a winding radius, the flexible displays are prone to overlap and thus cause mechanical scratches.

Figure 1:
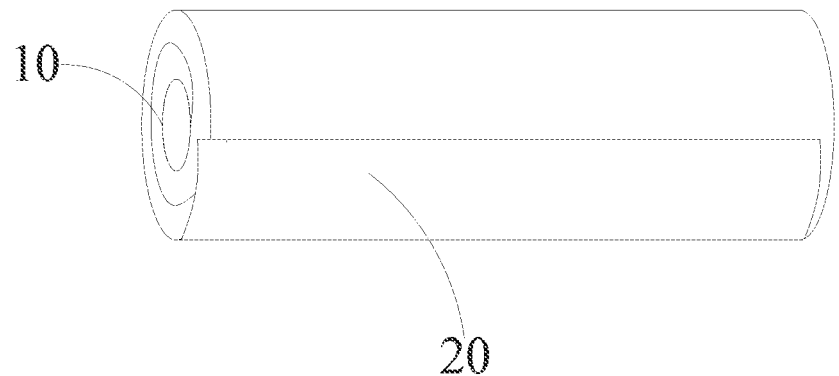
FIG. 1 is a schematic perspective structural view of a flexible display device provided by an embodiment of the present invention.
Figure 2:
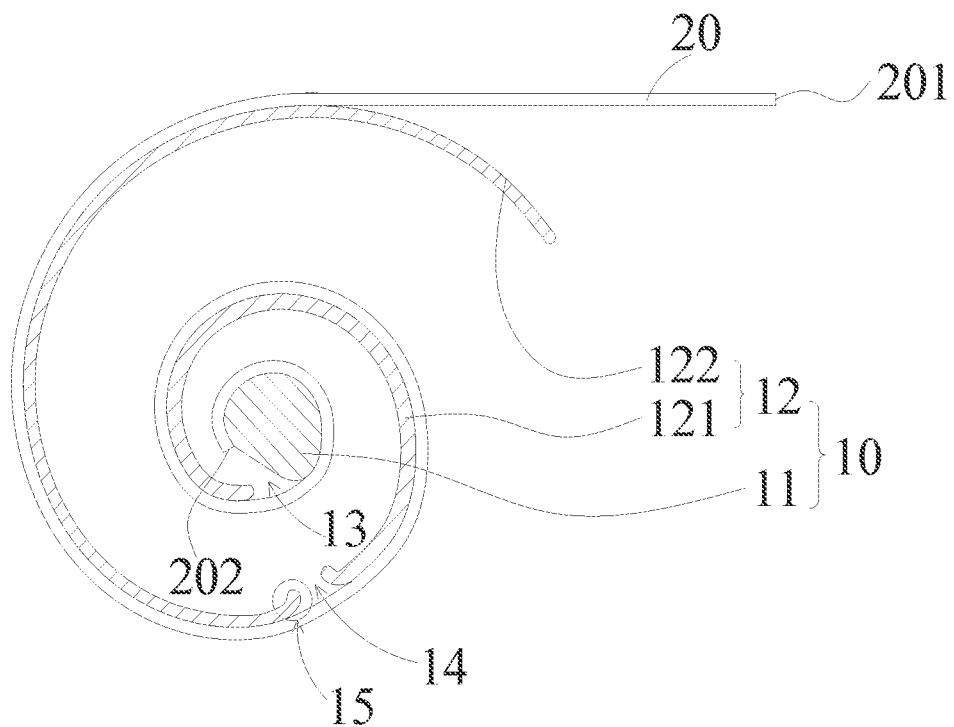
FIG. 2 is a schematic cross-sectional structural view of the flexible display device of FIG. 1.

As shown in FIGS. 1 and 2, an embodiment of the present invention provides a flexible display device a rolling assembly 10 and a flexible display module 20 at least partially wound in the rolling assembly 10. The flexible display module 20 is configured to be wound about the rolling assembly under an external force to expand and retract.

The rolling assembly 10 has a spiral winding structure and includes a shaft 11 and at least a shell layer 12 coaxially arranged from an inside to an outside of the rolling assembly 10. The shaft and the shell layer 12 are coupled to each other and collectively form a cross-sectional curve based on a characteristic of an Archimedes spiral, so that the flexible display module 20 attached to an outer surface of the rolling assembly 10 can shift with a continuously changing curvature, thereby to freely and smoothly expand and retract.

The shell layer 12 may be a one-layered, two-layered, three-layered structure . . . or even a structure of more layers. When the shell layer 12 is a one-layered structure, the shell layer 12 and the shaft 11 are coupled to each other. When the shell layer 12 is a two-layered structure or a multilayer structure of more than two layers, adjacent two layers of the shell layer 12 are coupled to each other.

The flexible display module 20 includes a first end 201 and a second end 202 disposed opposite to each other. The first end 201 is fixedly connected to an outer surface of the shaft 11. The first end 201 may be fixedly connected to the shaft 11 by an adhesive. At least part of the flexible display module 20 is wound along an outer surface of the shell layer on the outer surface of the shaft 11. There is sufficient space provided between the shell layer 12 and the shaft 11, and between two adjacent layers of the shell layer 12, so that the flexible display module 20 wound on the shaft 11 and the two adjacent layers of the shell layer 12 are separated from each other in no contact with each other. The flexible display module 20 on adjacent two layers of the shell layer 12 does not overlap even if number of winding turns continuously increases and a winding radius gradually decreases during a process of retracting, thereby preventing mechanical scratches and extending a lifespan of the flexible display device.

When the flexible display module 20 is expanded under an external force, the flexible display module 20 is configured to drive the rolling assembly 10 to rotate in a direction of releasing the flexible display module 20 from a retracted state, the flexible display module 20 attached to the shell layer 12 is separated from the shell layer 12, and a linked state of the shell layer 12 and the shaft 11 is released. At this time, the shaft 11 accumulates energy to promote tension of the flexible display assembly 20. When the flexible display module 20 is retracted, the shaft 11 release the accumulating energy to drive the rolling assembly 10 to rotate in a direction of retracting the flexible display module 20, and the shell layer 12 and the shaft 11 return to the linked state, so that the flexible display module 20 being pulled out is wound back on the outer surface of the shell layer 12.

It should be noted that, the embodiments of the present invention are described by taking the shell layer of a two-layered structure as an example in order to clearly explain the technical solutions provided by the embodiments of the present invention. However, the structure of the shell layer having three layers or more is also applicable to the present invention.

The shell layer 12 includes an inner shell layer 121 coupled to the outer surface of the shaft 11, and an outer shell layer 122 coupled to an outer surface of the inner shell layer 121. The outer shell layer 122 is located at an outermost layer, the inner shell layer 121 is located at a middle layer, and the shaft 11 is located at an innermost layer. When being expanded, the flexible display module 20 is separated from the outer shell layer 122 and the inner shell layer 121 successively, and the outer shell layer 122 and the inner shell layer 121 successively release the linked state with the shaft 11. When being retracted, the flexible display module 20 is successively attached to the outer shell layer 122 and the inner shell layer 121, and the inner shell layer 121 and the outer shell layer 122 successively return to the linked state with the shaft 11.

Figure 3A:
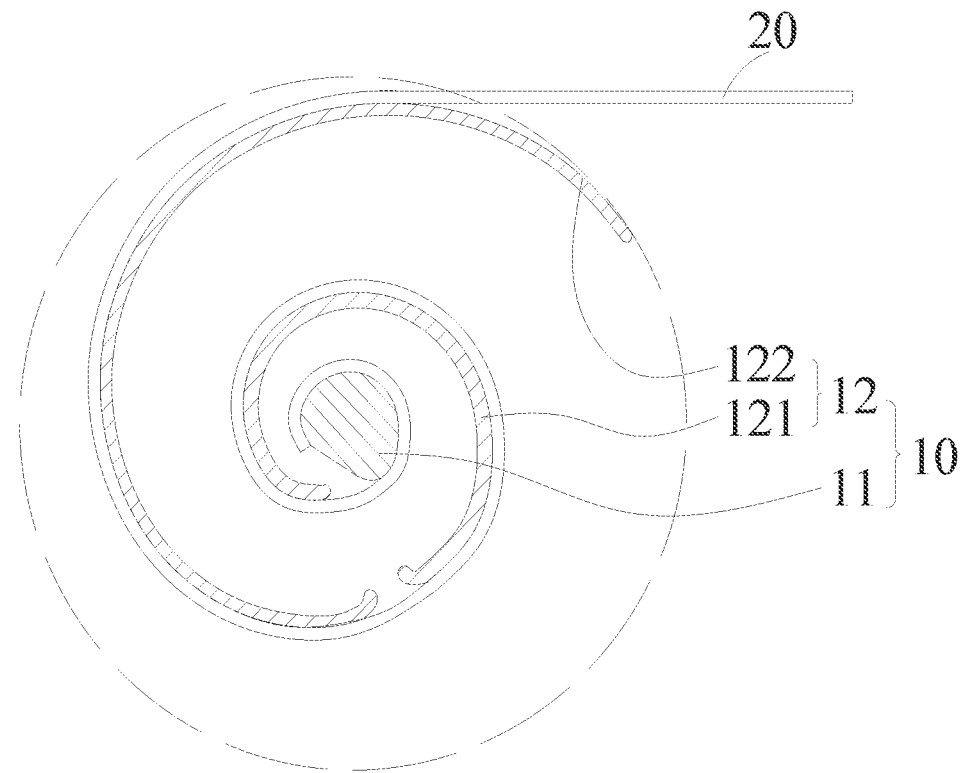
FIG. 3A is a schematic structural view of a flexible display device in a first state of an embodiment of the present invention.
Figure 3B:
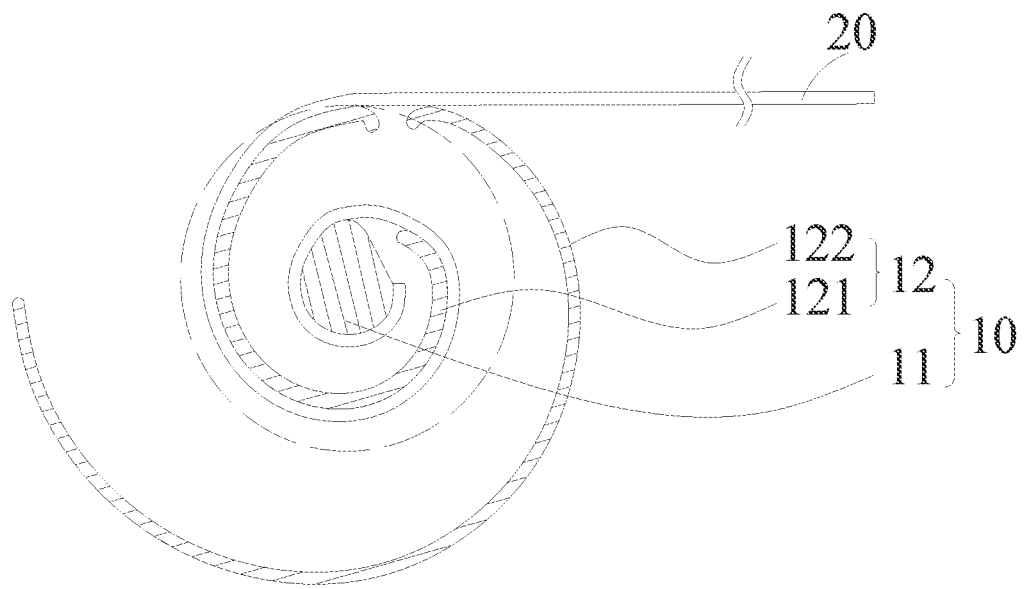
FIG. 3B is a schematic structural view of a flexible display device in a second state of an embodiment of the present invention.
Figure 3C:
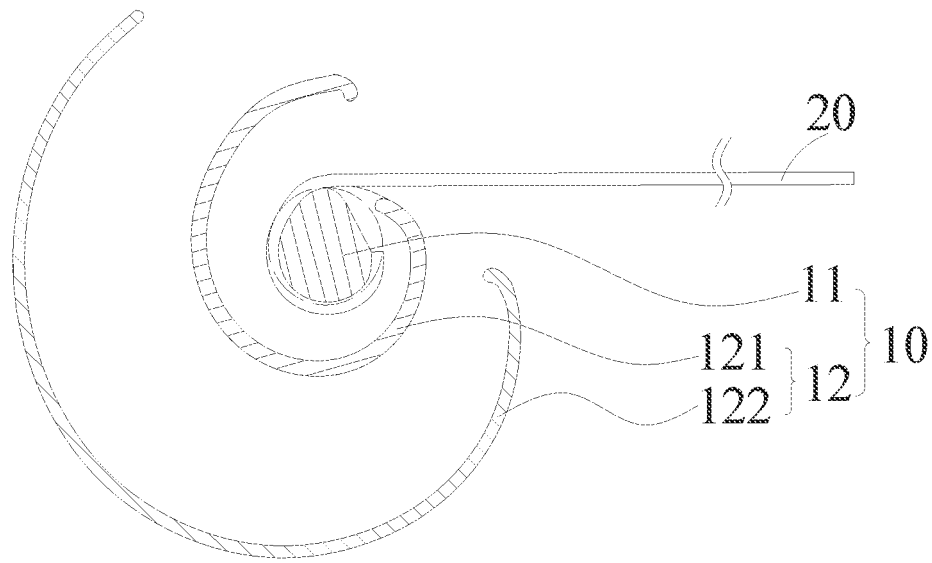
FIG. 3C is a schematic structural view of a flexible display device in a third state of an embodiment of the present invention.
Figure 4:
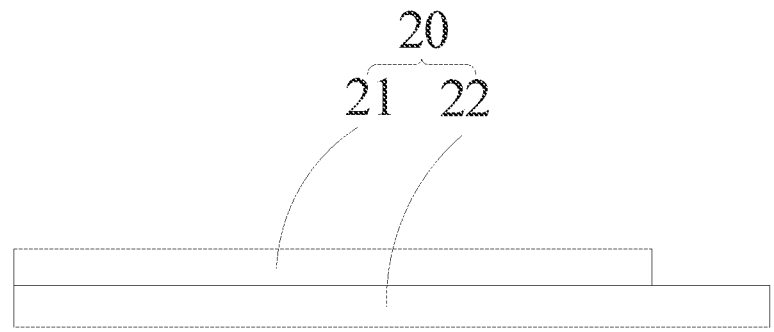
FIG. 4 is a schematic cross-sectional structural view of a flexible display device provided by an embodiment of the present invention.

Specifically, as a first state shown in FIG. 3A, in a process that the flexible display module 20 transitions from a retracted state to an expanded state, firstly, the shaft 11, the inner shell layer 121, and the outer shell layer 122 are kept in the linked state, that is, they rotate in conjunction with each other. Part of the flexible display module 20 attached to the outer surface of the outer shell layer 122 is gradually released till the flexible display module 20 reaches a second state as shown in FIG. 3B. At this time, the flexible display module 20 attached to the outer surface of the outer shell layer 122 completely expands, the outer shell layer 122 releases the linked state with the shaft 11 and stops rotating. Afterward, the shaft 11 is kept in the linked state with the inner shell layer 121, and they cooperate to allow another part of the flexible display module 20 attached to the outer surface of the inner shell layer 121 to be gradually released till the flexible display module 20 reaches a third state as shown in FIG. 3C. At this time, the flexible display module 20 attached to the outer surface of the inner shell layer 121 fully expands, the inner shell layer 121 releases the linked state with the shaft 11 and stops rotating. Finally, the shaft 11 itself rotates to gradually release a remaining part of the flexible display module 20 till the flexible display module 20 reaches a fourth state as shown in FIG. 4. At this time, the shaft 11 stops rotating, and the flexible display assembly 20 presents a maximum display area.

Figure 3D:
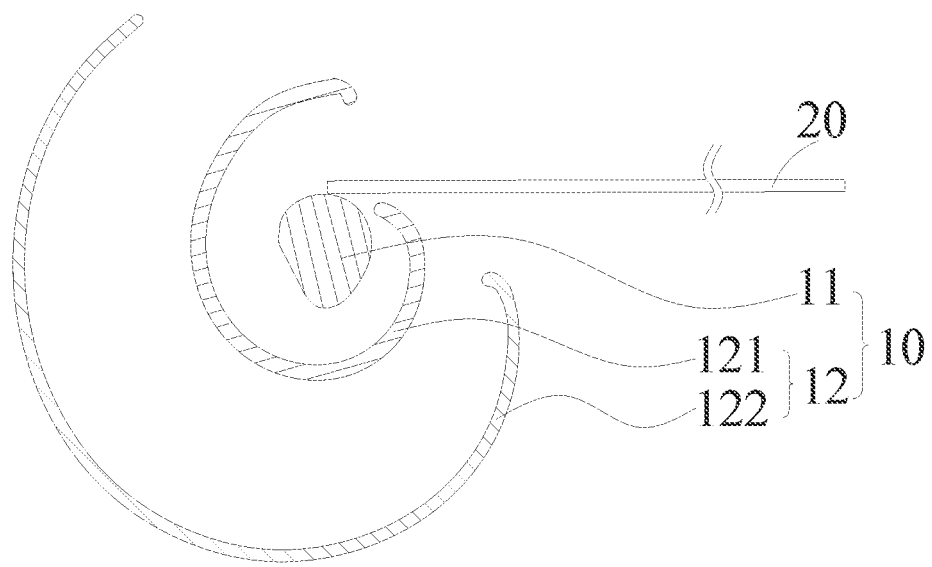
FIG. 3D is a schematic structural view of a flexible display device in a fourth state of an embodiment of the present invention.

On the contrary, as the fourth state shown in FIG. 3D, in a process that the flexible display module 20 transitions from the expanded state to the retracted state, firstly, the shaft 11 independently rotates to allow the flexible display module 20 to be gradually wound on the outer surface of the shaft 11 till the flexible display module 20 reaches the third state as shown in FIG. 3C. When the flexible display module 20 is in contact with the inner shell layer 121, the inner shell layer 121 and the shaft 11 return to the linked state and rotate simultaneously. The flexible display module 20 is gradually retracted on the outer surface of the inner shell layer 121 till the flexible display module 20 reaches the second state shown in FIG. 3B. When the flexible display module 20 is in contact with the outer shell layer 122, the outer shell layer 122 and the shaft 11 return to the linked state, and the outer shell layer 122, the inner shell layer 121, and the shaft 11 rotate simultaneously till they reach the first state shown in FIG. 3A. At this time, the flexible display module presents a minimum display area.

According to common knowledge, the Archimedes spiral equation is:

$$X=(\alpha+\beta\theta)\cos\theta$$

$$Y=(\alpha+\beta\theta)\sin\theta$$

It can be seen from the above equation that for a fixed coefficient $\alpha/\beta$, a spiral arm spacing is a fixed constant $2\pi\beta$. Therefore, a distance between the shell layer 12 and the shaft 11 and a distance between two adjacent shell layers 12 can be changed by adjusting the parameter ($\beta$ according to an actual situation of the flexible display assembly 20, thereby to control a range of curvature radius.

It can be understood that a maximum radius of gyration of the outer shell layer 122 and the inner shell layer 121 should be greater than their minimum radius of gyration, respectively (In FIGS. 3A to 3D, a dotted line indicates the maximum radius of gyration of the outer shell 122 and the inner shell 121), so as to ensure that each layer of the shell layer 12 can maintain independent movement in a non-linked state. Specifically, when the outer shell layer 122 is not in the linked state with the inner shell layer 121 and the shaft 11, the outer shell layer 122 is prevented from hindering the inner shell 121 and the shaft 11 to continue rotating. When the linked state between the inner shell layer 121 and the shaft 11 is released, the inner shell layer 121 is prevented from hindering the shaft 11 to continue rotating.

A first gap 13 is provided at a juncture of the inner shell layer 121 and the shaft 11, and a second gap 14 is provided at a juncture of the inner shell layer 121 and the outer shell layer 122. The first gap 13 and the second gap 14 collectively allow the shaft 11, the inner shell layer 121, and the outer shell layer 122 for formation of the cross-sectional curve being a quasi-continuous Archimedes spiral, so that the outer shell layer 122, the inner shell layer 121, and the shaft 11 are independent of one another in structure. It should be noted that the quasi-continuous Archimedes spiral means that the presence of the first gap 13 and the second gap 14 will not affect flatness of the flexible display module 20 during the expanding and retracting processes.

Further, the inner shell layer 121 is provided with transition portions 15 disposed at where the inner shell layer 121 adjoins the first gap 13 and the second gap 14, and the outer shell layer 122 is provided with a transition portion 15 disposed at where the outer shell layer 122 adjoins the second gap 14 in order to prevent stress concentration from occurring on the flexible display module 20 due to mechanical action during the expanding and retracting processes. Each of the transition portions 15 is arc-like in shape, so that the flexible display module 20 can freely and smoothly expand and retract.

Further, as shown in FIG. 4, the flexible display module 20 includes a flexible display screen 21 and an anti-slip layer 22 to protect the flexible display module 20 and to reduce friction and relative sliding of contact surfaces between the flexible display module 20 and the rolling assembly 10, thereby to achieve effects of cushioning and shock absorption. The anti-slip layer 22 is disposed on the outer surfaces of the shaft 11 and the shell layer 12, and the flexible display screen 21 is laminated to the anti-slip layer 22. The anti-slip layer 22 is made of ethylene vinyl acetate copolymer (EVA) plastic material with a vinyl acetate copolymer (VA) content greater than 30%. Due to low modulus and good resilience, polymer elastomer can reduce the mechanical damage caused by direct contact of the flexible display screen 21 with metal. In addition, in the embodiment of the present invention, a friction coefficient between the anti-slip layer 22 and the flexible display screen 21 is greater than or equal to 0.7, which can effectively reduce the relative friction caused during a contact process.

The anti-slip layer 22 has a length greater than a length of the flexible display screen 21, and an orthographic projection of the flexible display screen 21 on the anti-slip layer 22 all falls on the anti-slip layer 22. One end of the anti-slip layer 21 is fixedly connected to the shaft 11, and another end extends out of the flexible display screen 21. Because the flexible display screen 21 is laminated to the anti-slip layer 22, a force received by the flexible display module 20 during the expanding and retracting processes acts on the anti-slip layer 22, thereby protecting the flexible display screen 21 from being pulled by a large external force and avoiding failure of the flexible display screen 21.

Figure 5:
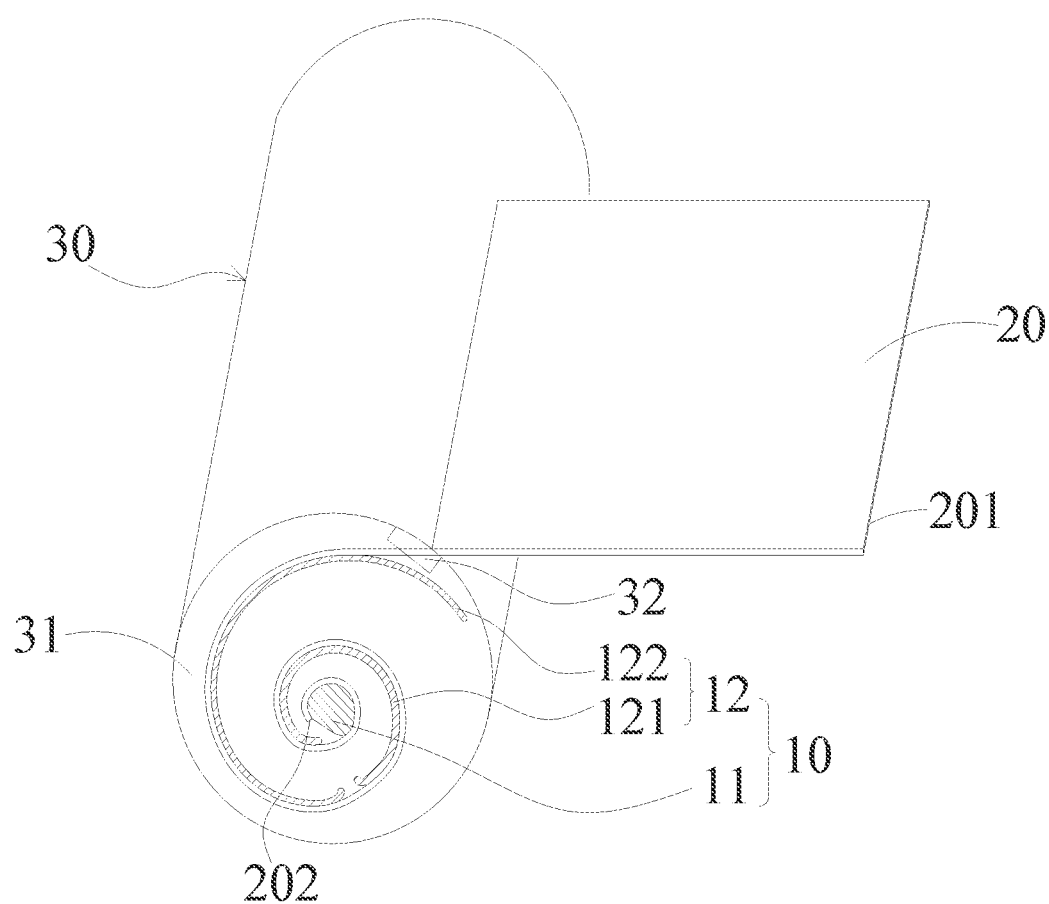
FIG. 5 is a schematic perspective structural view of a flexible display device provided by another embodiment of the present invention.

As shown in FIG. 5, the flexible display device further includes a housing 30. The housing 30 is not only configured to protect the flexible display module 20 and the rolling assembly 10, but also to function as an operating platform for the expanding and retracting processes of the flexible display module 20. The housing 30 includes an accommodating chamber 31 in which the rolling assembly 10 is rollably disposed. Furthermore, the housing 30 is provided with an opening 32 communicating with the accommodating chamber 31. The second end 202 of the flexible display module 20 extends from the opening 32 into the accommodating chamber 31 to be fixedly connected to the shaft 11, and the first end 201 of the flexible display module 20 is located outside the housing 30.

Figure 6:
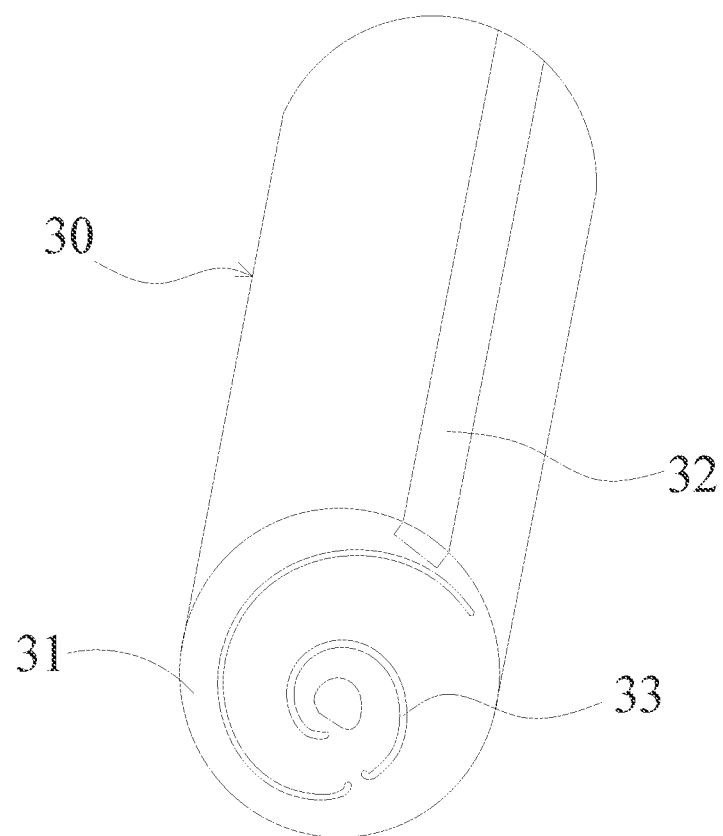
FIG. 6 is a schematic perspective structural view of a housing of FIG. 5.

As shown in FIG. 6, an inner side wall of the housing 30 is provided with a slide rail 33 corresponding to the shaft 11 and the shell layer 12 for fixing the rolling assembly 10 in the accommodating chamber 31. The slide rail 33 corresponds to side portions of the shaft 11 and the shell layer 12. A plane on which the side portions of the shaft core 11 and the shell layer 12 are located is perpendicular to a long axis of the shaft 11. When the shaft 11 and the shell layer 12 rotate, the shaft 11 and the shell layer 12 slide along the slide rail 33. The slide rail 33 is configured with a trajectory curve coinciding with the cross-sectional curve of the shaft 11 and the shell layer 12, and therefore the trajectory curve of the slide rail 33 also conforms to the Archimedes spiral equation.

Further, a plurality of sliders are disposed on side portions of the shaft 11 and the shell layer 12, respectively, and the sliders protrude toward corresponding sides of the housing 30, and the sliders are slidable along the slide rail 33. Preferably, the sliders may be replaced with a plurality of balls to reduce the friction with the slide rail 33, so that the shaft 11 and the shell layer 12 rotate more smoothly.

It should be noted that a fixed connection manner of the rolling assembly 10 and the housing 30 provided in the embodiment of the present invention is only one of many ways, and is not limited thereto.

The present invention has advantageous effects as follows: a flexible display device provided by an embodiment of the present invention using a rolling assembly disposed in the flexible display device for retracing a flexible display module and including a structure of a shaft and a shell layer coaxially disposed and coupled to each other based on a characteristic of an Archimedes spiral, with a linkage operation of the shaft and the shell layer, can prevent mechanical scratches caused by overlap of the flexible display module from occurring in a retracting process and can reduce a probability of stress concentration in the retracting process, so that the flexible display module can freely and smoothly expand and retract.

Accordingly, although the present invention has been disclosed as a preferred embodiment, it is not intended to limit the present invention. Those skilled in the art without departing from the scope of the present invention may make various changes or modifications, and thus the scope of the present invention should be after the appended claims and their equivalents.

What is claimed is:

1. A flexible display device, comprising:
   a rolling assembly and a flexible display module at least partially wound in the rolling assembly;
   wherein the rolling assembly comprises a shaft and at least a shell layer coaxially arranged from an inside to an outside of the rolling assembly, the shaft and the at least a shell layer are coupled to each other and collectively allow for formation of a cross-sectional curve based on a characteristic of an Archimedes spiral, and the flexible display module comprises a first end fixedly connected to the shaft by an adhesive;
   wherein the flexible display module is configured to drive the rolling assembly to rotate in a direction of releasing the flexible display module from a retracted state along with a process of expanding the flexible display module, enabling a linked state of the shell layer and the shaft to be released; and
   wherein the rolling assembly is configured to rotate in a direction of retracting the flexible display module along with a process of retracting the flexible display module, enabling the shell layer and the shaft to return to the linked state.

2. The flexible display device of claim 1, wherein the shell layer comprises an inner shell layer coupled to an outer surface of the shaft, and an outer shell layer coupled to an outer surface of the inner shell layer;
   wherein the flexible display module is separated from the outer shell layer and the inner shell layer successively, and the outer shell layer and the inner shell layer successively release the linked state with the shaft along with the process of expanding the flexible display module; and
   wherein the flexible display module is successively attached to the outer shell layer and the inner shell layer, and the inner shell layer and the outer shell layer successively return to the linked state with the shaft along with the process of retracting the flexible display module.

3. The flexible display device of claim 2, wherein a first gap is provided at a juncture of the inner shell layer and the shaft, and a second gap is provided at a juncture of the inner shell layer and the outer shell layer, wherein the first gap and the second gap collectively allow the shaft, the inner shell layer, and the outer shell layer for formation of the cross-sectional curve being a quasi-continuous Archimedes spiral.

4. The flexible display device of claim 3, wherein the inner shell layer is provided with transition portions disposed at where the inner shell layer adjoins the first gap and the second gap, and the outer shell layer is provided with a transition portion disposed at where the outer shell layer adjoins the second gap.

5. The flexible display device of claim 4, wherein each of the transition portions of the inner shell layer and the outer shell layer is arc-like in shape.

6. The flexible display device of claim 1, wherein the flexible display module comprises an anti-slip layer disposed on outer surfaces of the shaft and the shell layer, and a flexible display screen disposed on the anti-slip layer.

7. The flexible display device of claim 6, wherein the anti-slip layer has a length greater than a length of the flexible display screen, one end of the anti-slip layer is fixedly connected to the shaft, and another end extends out of the flexible display screen.

8. The flexible display device of claim 6, wherein the anti-slip layer is made of ethylene vinyl acetate copolymer (EVA) plastic material with a vinyl acetate copolymer (VA) content greater than 30%.

9. The flexible display device of claim 6, wherein an orthographic projection of the flexible display screen on the anti-slip layer all falls on the anti-slip layer.

10. The flexible display device of claim 6, wherein the flexible display screen is laminated to the anti-slip layer.

11. The flexible display device of claim 10, wherein a friction coefficient between the anti-slip layer and the flexible display screen is greater than or equal to 0.7.

12. The flexible display device of claim 1, further comprising a housing comprising an accommodating chamber in which the rolling assembly is rollably disposed;
    wherein the housing is provided with an opening communicating with the accommodating chamber, the flexible display module further comprises a second end extending from the opening into the accommodating chamber to be fixedly connected to the shaft, and the first end of the flexible display module is located outside the housing.

13. The flexible display device of claim 12, wherein an inner side wall of the housing is provided with a slide rail corresponding to the shaft and the shell layer, the shaft and the shell layer are slidable along the slide rail, and the slide rail is configured with a trajectory curve coinciding with the cross-sectional curve of the shaft and the shell layer.

14. The flexible display device of claim 13, wherein a plurality of sliders or a plurality of balls are disposed on side portions of the shaft and the shell layer, respectively, and the sliders protrude toward corresponding sides of the housing, wherein the sliders are slidable along the slide rail.

15. The flexible display device of claim 14, wherein the slide rail corresponds to the side portions of the shaft and the shell layer, and a plane on which the side portions of the shaft and the shell layer are located is perpendicular to a long axis of the shaft.

16. The flexible display device of claim 1, wherein the shell layer is a one-layered structure, a two-layered structure, or a multi-layered structure of more than two layers; and on a condition that the shell layer is a two-layered structure or a multi-layered structure of more than two layers, adjacent two layers of the shell layer are coupled to each other.

17. A flexible display device, comprising:

a rolling assembly; and a flexible display module at least partially wound in the rolling assembly, wherein the rolling assembly comprises a shaft and at least a shell layer coaxially arranged from an inside to an outside of the rolling assembly, the shaft and the at least a shell layer are coupled to each other and collectively allow for formation of a cross-sectional curve based on a characteristic of an Archimedes spiral, and the flexible display module comprises a first end fixedly connected to the shaft;

wherein the flexible display module is configured to drive the rolling assembly to rotate in a direction of releasing the flexible display module from a retracted state along with a process of expanding the flexible display module, enabling a linked state of the shell layer and the shaft to be released;

wherein the rolling assembly is configured to rotate in a direction of retracting the flexible display module along with a process of retracting the flexible display module, enabling the shell layer and the shaft to return to the linked state;

wherein the shell layer comprises an inner shell layer coupled to an outer surface of the shaft and an outer shell layer coupled to an outer surface of the inner shell layer;

wherein the flexible display module is separated from the outer shell layer and the inner shell layer successively, and the outer shell layer and the inner shell layer successively release the linked state with the shaft along with the process of expanding the flexible display module; and wherein the flexible display module is successively attached to the outer shell layer and the inner shell layer, and the inner shell layer and the outer shell layer successively return to the linked state with the shaft along with the process of retracting the flexible display module.

18. The flexible display device of claim 17, wherein a first gap is provided at a juncture of the inner shell layer and the shaft, and a second gap is provided at a juncture of the inner shell layer and the outer shell layer, wherein the first gap and the second gap collectively allow the shaft, the inner shell layer, and the outer shell layer for formation of the cross-sectional curve having a quasi-continuous Archimedes spiral.

19. A flexible display device, comprising:

a rolling assembly;

a flexible display module at least partially wound in the rolling assembly; and a housing comprising an accommodating chamber in which the rolling assembly is rollably disposed, wherein the rolling assembly comprises a shaft and at least a shell layer coaxially arranged from an inside to an outside of the rolling assembly, the shaft and the at least a shell layer are coupled to each other and collectively allow for formation of a cross-sectional curve based on a characteristic of an Archimedes spiral, and the flexible display module comprises a first end fixedly connected to the shaft;

wherein the flexible display module is configured to drive the rolling assembly to rotate in a direction of releasing the flexible display module from a retracted state along with a process of expanding the flexible display module, enabling a linked state of the shell layer and the shaft to be released;

wherein the rolling assembly is configured to rotate in a direction of retracting the flexible display module along with a process of retracting the flexible display module, enabling the shell layer and the shaft to return to the linked state;

wherein the housing is provided with an opening communicating with the accommodating chamber, the flexible display module further comprises a second end extending from the opening into the accommodating chamber to be fixedly connected to the shaft, and the first end of the flexible display module is located outside the housing; and wherein an inner side wall of the housing is provided with a slide rail corresponding to the shaft and the shell layer, the shaft and the shell layer are slidable along the slide rail, and the slide rail is configured with a trajectory curve coinciding with the cross-sectional curve of the shaft and the shell layer.

20. The flexible display device of claim 19, wherein a plurality of sliders are disposed on side portions of the shaft and the shell layer, respectively, and the sliders protrude toward corresponding sides of the housing, wherein the sliders are slidable along the slide rail.

* * * * *